July 26, 1960
A. WELZ  2,946,447
APPARATUS FOR FILTERING LIQUIDS, PARTICULARLY FOR USE IN THE BEVERAGE INDUSTRY
Filed Oct. 23, 1958

Alfred WELZ
INVENTOR

By: Wenderoth, Lind & Ponack
Attys

United States Patent Office 2,946,447
Patented July 26, 1960

2,946,447

APPARATUS FOR FILTERING LIQUIDS, PARTICULARLY FOR USE IN THE BEVERAGE INDUSTRY

Alfred Welz, Zurich, Switzerland, assignor to Filtrox-Werke A.G., St. Gallen, Switzerland Filed Oct. 23, 1958, Ser. No. 769,180

Claims priority, application Switzerland Oct. 26, 1957

4 Claims. (Cl. 210—333)

This invention relates to an apparatus for filtering liquids, particularly intended for use in the beverage industry. The apparatus has in known manner at least one filter element, on which a filter cake can deposit. The novelty lies essentially in that the filter element is arranged on a rotatably mounted shaft associated with a driving device for causing the filter element to rotate, and that within the casing surrounding the filter element there is provided at least one jet nozzle directed towards the filter element, with the help of which, as the filter element rotates, the same can be cleared of the filtered residues by a jet of a liquid.

Advantageously, the driving device may be a liquid turbine which also accommodates the casing containing the filter element. A plurality of filter elements may be removably arranged on the same shaft and within the same casing, each filter element having associated therewith at least one jet nozzle serving for cleaning the same.

Further features of the invention will appear from the following description and claims, taken in conjunction with the accompanying drawing, wherein there is shown by way of example a preferred form of embodiment incorporating the invention.

Figure 1:
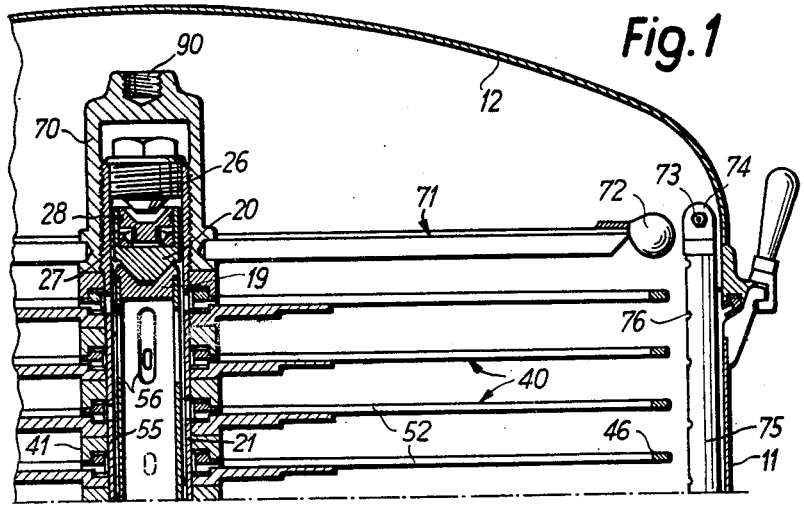
Fig. 1 shows a fragmentary sectional view of the filtering apparatus along the axis of the shaft by which the filter element can be caused to rotate.

Referring to Fig. 1, the filtering apparatus comprises a drum-shaped casing 11 which is provided with a removable cover 12. The casing is firmly supported in a way not shown. Into a central recess in the bottom of said casing, a bearing piece 13 is fitted fluid-tight, with a hub-like extension 14 having a vertical tubular piece 15 mounted therein for endwise displacement. A pin 16, inserted in the extension 14, engages a short longitudinal groove 17 of the tubular piece 15, securing the same from rotation. In the position shown, the lower end of said tubular piece rests by means of a flange of a bush 18 on a shoulder of the extension 14. The upper extremity of the tubular piece 15 is closed by a plug 19 which has an upwardly open conical recess engaged by a suitable projection of a bush 20. The parts 15, 19 and 20 together form a supporting column (15, 19, 20) surrounded by a coaxially arranged hollow shaft 21, the lower end of which is seated fast in a flange sleeve 22, the lower end of said shaft resting on an internal collar of the flange sleeve 22. The latter is rotatably and axially slidably carried in a suitable bearing recess of the bearing piece 13. In the position shown of the sleeve 22, its flange 23 is supported on the upper side of said bearing piece with a sealing ring 24 interposed. The flange sleeve 22 and the tubular piece 15 have a bearing bush 25 therebetween. The upper end of the hollow shaft 21 is closed by a threaded plug 26 which has a tapered projection below. The aforesaid bush 20 includes a carrier piece 28 which is rotatably supported therein by means of a taper roller bearing 27 and is provided with an upwardly open conical recess forming a seat for the conical projection of the screw-plug 26, when the supporting column 15, 19, 20 is pushed upwards a sufficient amount.

The downwardly pointing end portion of the extension 14 is shaped to a housing part 31 and is closed fluid-tight at the bottom. The housing 31 incorporates a plunger 33 which is slidable vertically and engages the bush 18 by a spigot 34. Connected to the bottom 32 is a pipe line 35 through which a pressure fluid, say, water, can be admitted to and drained from the space below the plunger 33, to raise or lower the same. The assembly 31—34 constitutes a hydraulic lifting device serving for axial displacement of the supporting column 15, 19, 20.

Figure 2:
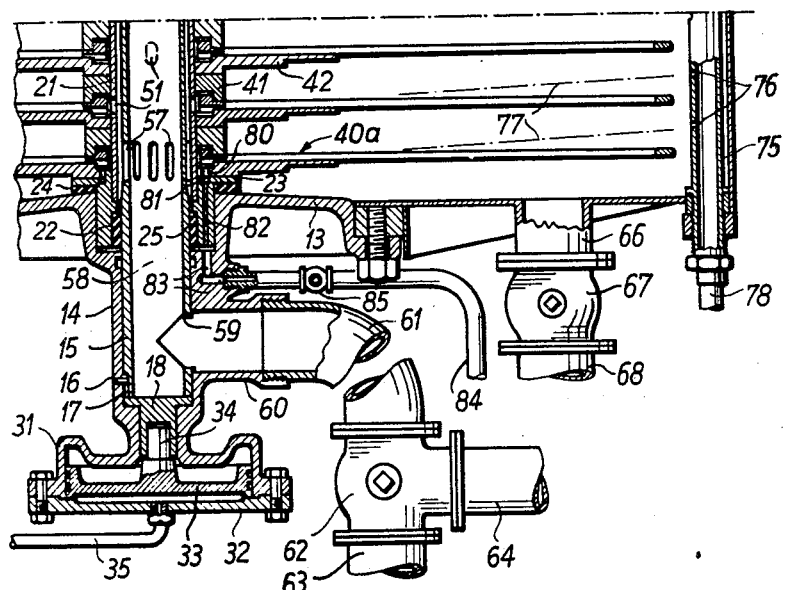
Fig. 2 shows a detail of Fig. 1, on a larger scale.
Figure 2:
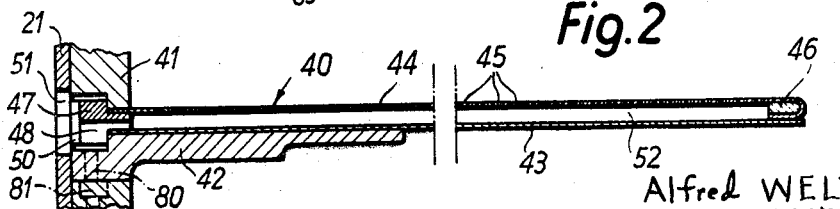

The hollow shaft 21 has a plurality of disk-shaped filter elements 40 and a filter element 40a coaxially pushed thereon, having spacer rings 41 interposed therebetween. Each of the filter elements 40 and 40a is designed as a hollow body and includes a central plate 42 carrying a circular plate 43, as can be more distinctly seen in Fig. 2. At some distance above said plate 43 there extends a sieve plate 44 which is provided with a large number of fine perforations for the filtrate to pass through. At its outer circumferential rim, the plates 43, 44 are interconnected fluid-tight and fitted with a stiffening ring 46. To let the shaft 21 through, the two plates 43, 44 have a central opening, the circumferential rim of which is supported respectively from above and below against a ring member 47 and thrust thereon by the carrier plate 42 and/or spacer ring 41. The ring member 47 has several radial grooves 48. Provided between said ring member and shaft 21 is an annulus 50. The hollow shaft 21 is provided with several radial ports 51, each two of which, located diametrically opposite each other, open into the annulus 50 of each filter element 40, except the lowest one 40a. From the foregoing it appears that the interior 52 of the filter element 40 communicates with the interior of the shaft 21 through the grooves 48, annulus 50 and ports 51.

Furthermore, between the hollow shaft 21 and column 15, 19, 20 there is an annulus 55 communicating with the hollow space 58 of the tubular piece 15 of the column through several radial ports 56 and 57. From this hollow space 58, a radial opening 59, arranged in the lower end portion of the tubular member 15, leads to an outlet branch 60 mounted on the extension 14 of the bearing piece 13, said branch communicating via piping 61 with a cock 62 which is designed as branch piece to selectively shut off the piping 61 or to connect it to piping 63 or another piping 64. Also provided at the bottom of the casing 11 is a branch 66 having joined to it piping 68 through the intermediary of a shut-off cock 67.

From the interior 52 of the lowest filter element 40a there exists no connection to the interior of the shaft 21 and to the hollow space 58 of the supporting column. On the other hand, the carrier table 42 of the filter element 40a has several axial apertures 80 which connect the grooves 48 of the ring member 47 with an annular groove 81 machined into the upper end face of the flange sleeve 22 (cf. dash-dotted lines in Fig. 2). From the annular groove 81, bores 82 lead axially through the wall of the sleeve 22. In the hub-like extension 14 of the bearing piece 13 there are several bores 83 in connection with a pipe line 84 with shut-off member 85. Consequently the interior 52 of the lowest filter element 40a communicates with the pipe line 84 via grooves 48, apertures 80, annular groove 81, bores 82 and bores 83.

The threaded top end of the hollow shaft 21 has a screw-on cap 70, by means of which the stack of filter elements 40 and spacer rings 41 is pressed against the flange 23 of the sleeve 22. But the cap 70 is also the hub of a wheel 71, on the circumference of which there is provided a ring of bucket-like blades 72 of a fluid-jet turbine serving to drive the shaft 21 and filter elements 40. The jet nozzle 73 associated with the blade wheel 71 is located at one end cap 74 of a vertical tube 75 arranged within the casing 11 between its circumferential wall and the periphery of the filter elements 40. The outlet of the jet nozzle 73 runs tangentially to the circumferential direction of the blade ring 72. The tube 75 is further provided with a series of radial ports 76 which likewise form jet nozzles. Each of the filter elements 40 has one of the nozzles 76 associated therewith, and the outlet direction of said nozzles 76 runs at an acute angle nearly parallel to the upper side, that is to the sieve plate 44 of the filter elements 40, as indicated in chain-dotted lines 77 in Fig. 1. The lower end of the tube 75 communicates via a pipe 78 and shut-off member (not shown) with a source of pressure fluid, say, a pressure water line.

The action of the aforedescribed filtering apparatus is as follows:

A liquid to be filtered, which may also have mixed thereto a filter aid in the form of, say, granular diatomaceous earth, is constrained to pass under pressure through the pipe line 68 or another inlet into the container 11. For lack of another discharge path, the liquid passes through the fine perforations 45 into the hollow space 52 of the filter elements 40, and then enters through the grooves 48, ports 51, annulus 55 and ports 56, 57 into the hollow space 58 of the tubular piece 15, whence the filtrate flows off into the piping 61, 63. The lowest filter element 40a is not yet in operation, since the shut-off member 85 is kept closed.

The solid matter contained in the liquid being filtered, in particular also the filter aid, cannot pass through the perforations of the sieve plates 44 and will consequently be deposited on the upper side thereof so as to form a filter cake which subsequently undertakes the filtering-out of the substances causing turbidity, i.e. of the very fine particles of foreign matter in the liquid. During this filtering operation, the feed of pressure liquid to the tube 75 fitted with the jet nozzles 73, 76 is interrupted, and the plunger 33 moves down into the position shown, so that also the column 15, 19, 20 and the shaft 21 will take up the position as in Fig. 1.

When, after a certain operating time, the filter cakes become clogged, the described apparatus can be cleaned in a simple manner. To this effect, at first the feed of liquid to be filtered is shut off, the cock 67 being closed. Through an inlet branch (not shown) a pressure gas, say, carbonic acid is admitted into the casing 11, in order to constrain as far as possible the filtration liquid still present therein to pass into the piping 61, 63 and/or 84. When the liquid level in the casing 11 has fallen to the height of the top filter element 40, the pressure gas is permitted to escape through said element into the discharge pipe 61, 63. Now the cock 62 should be closed in order to fully shut off the pipe 61. Thereupon, the pressure gas is permitted further to act upon the liquid which, however, will then only be filtered through the lowest element 40a, with shut-off member 85 opened. From the interior of the lowest element 40a, the filtrate flows off through the grooves 48, apertures 80, annular groove 81 and bores 82, 83 into the pipe 84 which, beneath the cock 62, preferably opens into the pipe 73. When the liquid level in the casing 11 has fallen to the element 40a, filtering can no longer proceed. The comparatively slight quantity of still unfiltered liquid in the casing 11 may be withdrawn through the pipe 68 by opening the cock 67. This residual liquid may subsequently be treated further, either in a separate filter or in the filtering apparatus after it has been cleaned.

After the casing 11 has been emptied, by setting the cock in a suitable position, a pressure water is admitted through the pipe lines 64 and 61, which then enters the hollow spaces of the filter elements 40 and escapes through the perforations 45 into the casing 11 so as to loosen the filter cakes. Now also a pressure liquid is admitted into the pipe 35 thus causing the plunger 33 to rise. By means of the bush 18, the plunger 33 pushes the column 15, 19, 20 upwards, whose upper end—through the taper rolling bearing 27 and carrier piece 28—causes the threaded plug 26 and thus the hollow shaft 21 to rise with the parts arranged thereon. Incidentally, the flange 23 of the sleeve 22 moves a few millimeters upwards so that the pressure upon the brake ring 24 ceases to act. Now the shaft 21 is freely rotatable without any frictional forces worth mentioning. Into the pipe 75, pressure water is then admitted, which again passes out through the jet nozzles 73, 76. The water jet leaving the nozzle 73, impinges tangentially upon the blade ring 72, thus causing the wheel 71 and hence the shaft 21 to rotate with the filter elements 40. The water jets issuing through the nozzles 76 squirt against the filter cakes which have deposited on the upper sides of the elements 40 and are now loosened and rinsed off by the water jets. As a result of the rotation of the filter elements 40, the whole periphery of each filter element repeatedly passes the range of action of the associated jet nozzle 76, and the loosened components of the filter cakes are thrown out by centrifugal action. With cock 67 open, the water used for cleaning is discharged through the pipe 68, through which also the filtration residues are led off. A small portion of the cleaning liquid will, through the elements 40, also enter the hollow space 58 of the tubular piece 15. Thus, for the cleaning operation, the cock 62 should be set so that the said portion of the cleaning liquid does not flow away into the filtrate pipe 63, but into the pipe 64. On completion of the cleaning, the water supply to the pipe 75 is again shut off and the pressure liquid can flow away from the space under the plunger 33 so that the column 15, 19, 20 and shaft 21 are lowered. After the cock 63 has been changed over, filtering may proceed in the same way as described hereinbefore.

The cleaning may be performed conveniently in a comparatively short time, whereby, in contradistinction of the filtering apparatuses known heretofore, withdrawal of the various filter elements is dispensed with. A further advantage of the described apparatus resides in that, when cleaning, practically nothing of the liquid being filtered will be lost. If necessary, the assembly of elements 40, 40a may be bodily withdrawn from the casing 11 upon removal of the cover 12. To this effect, a carrier hook or the like can be attached to the cap 70 by means of a screw-thread 90 to then lift the assembly, comprising tubular piece 21, bush 22, filter elements 40, 40a, spacer rings 41, screw-plug 26, cap 27 and turbine wheel 71, off the supporting column. Upon loosening the cap 70, the filter elements may be removed from the tubular piece 21.

The disclosed filtering apparatus is particularly suitable for the beverage industry, especially for filtering flavouring solutions.

Moreover, a form of embodiment of the filtering apparatus is conceivable, in which only a single filter element is provided. This need not in all cases have the outline of a disk, but could, for instance, also be drum-shaped so as to permit the filtration residues to deposit along its entire circumference. Whatever the design of the filter element may be, the interior of the hollow shaft carrying the filter element is always connected to the clear side of the latter, when the jet nozzle used for cleaning is disposed outside the element. Alternatively, if necessary, one and the same filter element may have two or more jet nozzles associated therewith. It is likewise possible to provide two or more jet nozzles for driving the turbine wheel 71. In many cases, it may be of advantage to arrange pipe lines separate for the feed of the pressure water to the jet nozzles for cleaning and to the jet nozzles for driving the turbine wheel, and to have separate shut off members allocated thereto. Advantageously, the jet nozzles used for cleaning the filter elements may be designed so as to be adjustable and fixable in their squirting direction. By suitable adjustment, the action of the jet nozzles may be enhanced.

For controlling the pressure water supply to the hydraulic lifting device 31—34, to the pipe 64, to the jet nozzles for cleaning the elements and to those for driving the turbine wheel, it is possible and advantageous to provide a single control member in the form of a multiway cock adapted to be brought successively into different control positions so that the proper sequence of opening and closing the flow-through is positively ensured.

In another modification (also not shown) of the filtering apparatus, the supporting column 15, 19, 20 may be additionally supported above on the cover 12 of the container 11, but so as to make possible the required axial displacement of the column also when the cover 12 is closed.

It is understood that the foregoing detailed description is given merely by way of illustration and that other variations may be made therein without departing from the spirit of my invention.

What I claim is:

1. A pressure liquid filtering apparatus, comprising in combination a closed casing with a liquid inlet, a vertical discharge tube traversing and sealed against the bottom of said casing, said discharge tube projecting into the casing with a portion having lateral openings, a hollow shaft surrounding said discharge tube and being rotatably supported by the same, a plurality of disk-shaped hollow filter elements mounted on said hollow shaft axially spaced from one another, the inside of said filter elements communicating with the inside of said hollow shaft, said hollow shaft being closed at its upper end, a flange arranged at the lower end portion of said hollow shaft and cooperating with a sealing means at the bottom of the casing, means for axially displacing said discharge tube for lowering or lifting said hollow shaft to make a liquid-tight seat or a clearance between said flange and said sealing means, a turbine blade wheel fixed on said hollow shaft, a first stationary jet-nozzle within said casing and directed towards said turbine blade wheel for rotation thereof, the shaft and the filter elements when said hollow shaft is lifted, and a plurality of other stationary liquid jet-nozzles within said casing and directed towards the surface of said filter elements for clearing them of the filtering residues deposited thereon.

2. A pressure liquid filtering apparatus according to claim 1, wherein said discharge tube is guided at its lower end portion in a hub-like portion of said bottom, and said filter elements and turbine blade wheel being removable from said hollow shaft by pulling them off the upper end of the hollow shaft.

3. A pressure liquid filtering apparatus according to claim 1, wherein said means for axially displacing said discharge tube is a hydraulic lifting device arranged at the lower end of said discharge tube and mounted at the underside of said bottom.

4. A pressure liquid filtering apparatus according to claim 1, wherein the inside of the lowest filter element communicates with an additional outlet, said discharge tube and said additional outlet having separate shut-off members independent of each other.

References Cited in the file of this patent
UNITED STATES PATENTS

| | | |
|---|---|---|
| 431,448 | Dixon | July 1, 1890 |
| 554,312 | Robinson | Feb. 11, 1896 |
| 1,350,433 | Atkins | Aug. 24, 1920 |
| 1,510,568 | Sweetland | Oct. 7, 1924 |
| 2,651,418 | Prendergast | Sept. 8, 1953 |